US008001160B2

(12) United States Patent
Weisflog

(10) Patent No.: US 8,001,160 B2
(45) Date of Patent: Aug. 16, 2011

(54) SYSTEMS FOR MANAGING CONSTRUCTION PROJECTS

(76) Inventor: Robert R. Weisflog, Lannon, WI (US)

( * ) Notice: Subject to any disclaimer, the term of this patent is extended or adjusted under 35 U.S.C. 154(b) by 424 days.

(21) Appl. No.: 12/264,718

(22) Filed: Nov. 4, 2008

(65) Prior Publication Data

US 2010/0114971 A1     May 6, 2010

(51) Int. Cl.
*G06F 17/30*     (2006.01)
(52) U.S. Cl. .................................... 707/802
(58) Field of Classification Search ............. None
See application file for complete search history.

(56) References Cited

U.S. PATENT DOCUMENTS

| | | |
|---|---|---|
| 6,446,053 B1 | 9/2002 | Elliott |
| 7,283,975 B2 | 10/2007 | Broughton |
| 7,330,821 B2 | 2/2008 | Wares |
| 2002/0099617 A1* | 7/2002 | Fogelson ................ 705/26 |
| 2003/0135401 A1* | 7/2003 | Parr ........................ 705/8 |
| 2003/0158796 A1* | 8/2003 | Balent ..................... 705/28 |
| 2004/0059592 A1* | 3/2004 | Yadav-Ranjan .......... 705/1 |
| 2004/0186763 A1* | 9/2004 | Smith ...................... 705/9 |
| 2006/0010005 A1* | 1/2006 | Rowland .................. 705/1 |
| 2006/0085322 A1* | 4/2006 | Crookshanks ........... 705/37 |
| 2008/0059220 A1* | 3/2008 | Roth et al. ............... 705/1 |

* cited by examiner

*Primary Examiner* — Mohammad Ali
*Assistant Examiner* — Syed H Hasan
(74) *Attorney, Agent, or Firm* — Dale J. Ream

(57) ABSTRACT

A system for managing construction projects includes at least one processor and electronic data storage device containing a database, the database having construction information saved therein and being in data communication with the processor. The system includes an input device for inputting contractor information, manager information, and job information into the database and associating respective job information with respective manager information. The processor includes programming to select particular contractor information from the contractor information and associate the particular contractor information with respective job information, to output the particular contractor information, to select particular construction information from the construction information and associate the particular construction information with respective job information, and output the particular construction information. The processor includes programming to allow communication between at least one contractor corresponding to the particular contractor information and a manager corresponding to the manager information associated with the job information.

9 Claims, 11 Drawing Sheets

SYSTEMS FOR MANAGING CONSTRUCTION PROJECTS

BACKGROUND OF THE INVENTION

The present invention relates generally to computer database systems and, more particularly, to a system for managing construction projects.

Thousands of people, particularly homeowners, build or remodel homes every year and, with the exception of a few capable or experienced people, these people have to hire a general contractor to oversee the project, organize subcontractors, and to obtain the needed materials. Using a general contractor is not only expensive, but it also diminishes the amount of control the homeowner has over their project and decreases the number of options available to the homeowner. Those who attempt to be their own contractor risk running afoul of local building codes, unwisely selecting subcontractors, or becoming frustrated while searching for construction materials.

Various methods have been proposed in the art for enabling a homeowner to gain control over the construction or remodeling process, including books and magazines for the do-it-yourselfer, home improvement stores with showrooms, or home decorating consultants. Although assumably effective for their intended purposes, the existing solutions to the difficulties of an inexperienced or amateur homeowner to manage a construction project do not provide a step-by-step guide through a selected construction project, offer ready access to local and available contractors, provide information on local building codes, or enable local contractors to make themselves known and available to amateur builders looking for assistance.

Therefore, it would be desirable to have computer implemented system that enables an amateur builder, such as a homeowner, to manage their own construction project by pulling step-by-step project procedures, local building codes, local subcontractor information, and construction material information from a national database using a kiosk input device in a publicly accessible location or home computer connection. Further, it would be desirable to have a system that enables subcontractors to make their services available to homeowner users of the system and even to bid on jobs being managed through the system. In addition, it would be desirable to have a system that enables contractors to obtain favorable insurance offerings by joining with other contractors using the system and to obtain favorable revenue streams by using the system.

SUMMARY OF THE INVENTION

Therefore, a system for managing construction projects according to the present invention includes at least one computer processor and at least one electronic data storage device containing at least one database, the at least one database having construction information saved therein and being in data communication with the at least one processor. The system includes an input device for inputting contractor information, manager information, and job information into the at least one database and associating respective job information with respective manager information. The processor includes programming to select particular contractor information from the contractor information and associate the particular contractor information with respective job information, to output the particular contractor information, to select particular construction information from the construction information and associate the particular construction information with respective job information, and output the particular construction information. The processor includes programming to allow communication between at least one contractor corresponding to the particular contractor information and a manager corresponding to the manager information associated with the job information.

Therefore, a general object of this invention is to provide a system for managing construction projects.

Another object of this invention is to provide a system for managing construction projects, as aforesaid, that enables a homeowner to enter project data into the management system from a kiosk or a home computer.

Still another object of this invention is to provide a system for managing construction projects, as aforesaid, that enables a homeowner to obtain step-by-step guidance for a selected construction project, including obtaining local building codes, local subcontractors on a bid basis, and construction materials.

Yet another object of this invention is to provide a system for managing construction projects, as aforesaid, in which the system includes a national database but can filter all database information to a user specific to the user's geographic location.

A further object of this invention is to provide a system for managing construction projects, as aforesaid, that enables subcontractors to register their available services on the system to be viewed by homeowner users of the system and that enables the subcontractors to bid on projects when selected by a respective project initiator.

A still further object of this invention is to provide a system for managing construction projects, as aforesaid, that enables contractors to associate together for group benefits and other economic advantages.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Systems for managing construction projects will now be described in detail with reference to FIG. 1 through FIG. 11 of the accompanying drawings.

Figure 3:
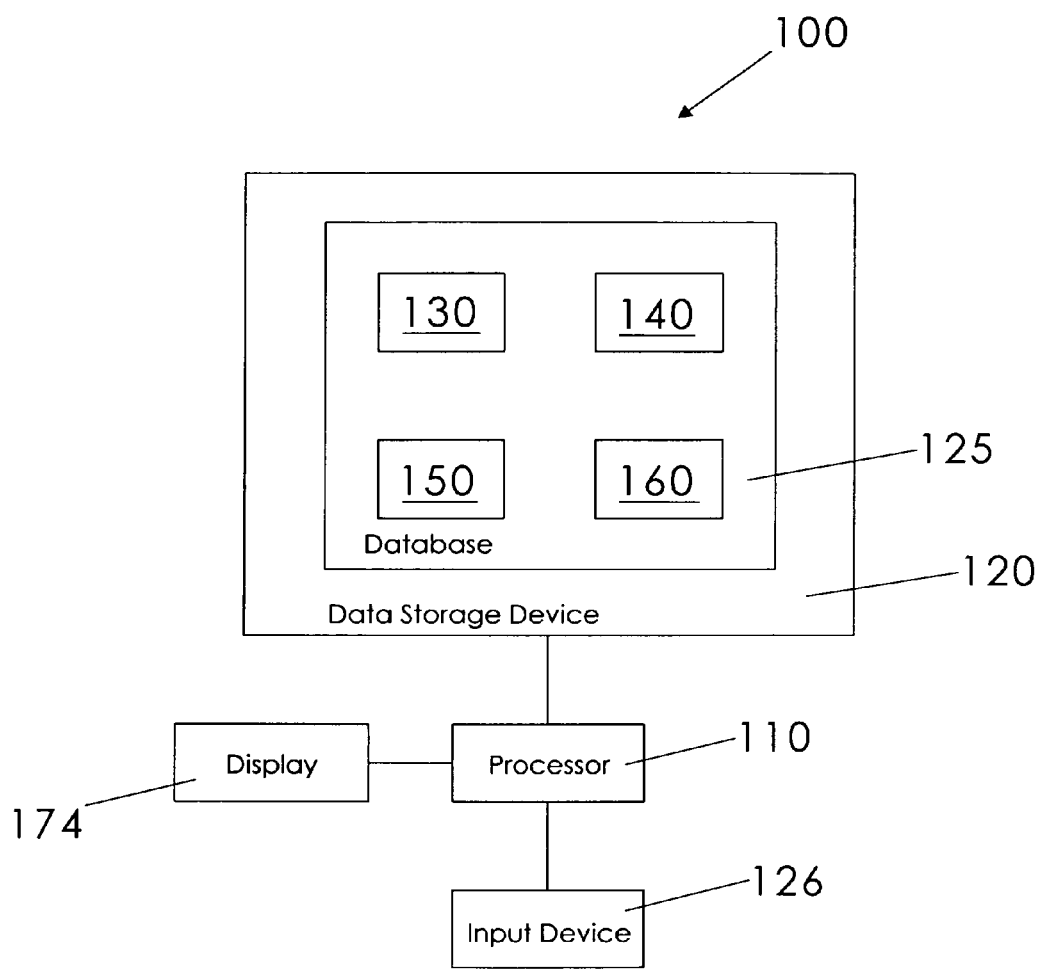
FIG. 3 is a block diagram of the system for managing construction projects according to a preferred embodiment of the present invention.
Figure 9:
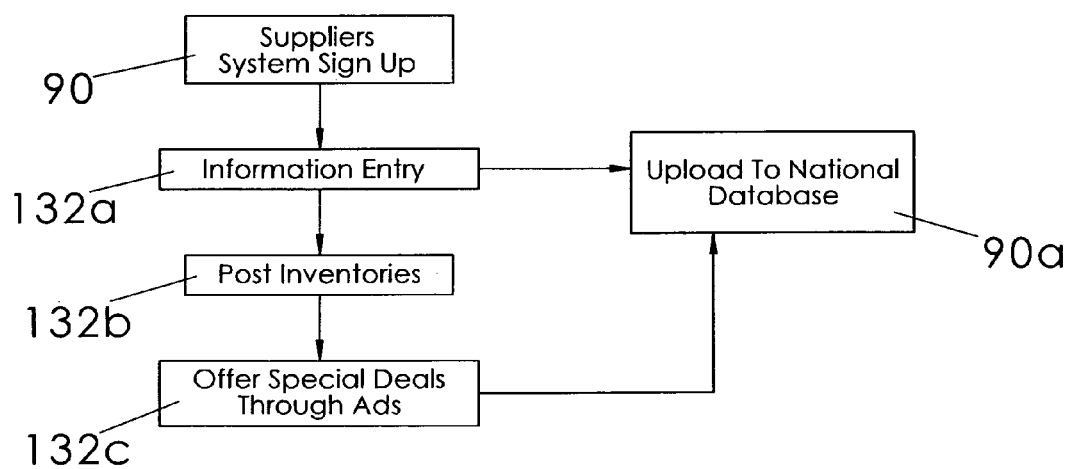
FIG. 9 is a flowchart of a processor of a materials supplier to post material information using the system of FIG. 3.

As shown in FIG. 3, the system 100 includes at least one computer processor 110 and at least one electronic data storage device 120 containing at least one database 125. The at least one database 125 has construction information 130 saved therein and is in data communication with the processor(s) 110. Construction information 130 may include, for example, how-to information for a plurality of jobs (e.g., construction plans, instructions, etc.), material information for the plurality of jobs (e.g., material lists 132a, inventory 132b, and/or pricing information 132c for appropriate and required materials), building code information for a plurality of locations, and building permit information for the plurality of locations. As shown in FIG. 9, suppliers 90 (e.g., retailers) may provide the material information 132a, 132b, 132c to a national database 90a that may be accessed by the database(s) 125, or the suppliers may provide the material information 132a, 132b, 132c directly to the database(s) 125. The material information 132a, 132b, 132c may be updated (e.g., periodically, real-time, etc.) by the suppliers 90 or another party as desired.

As shown in FIGS. 4 through 7, programming in the processor(s) 110 allows contractor information 140, manager information 150, and job information 160 to be input into the database(s) 125 through at least one electronic input device 126 (FIG. 3) that is in data communication with the processor(s) 110 and database(s) 125. Programming in the processor(s) 110 may also associate respective job information 160 with respective manager information 150.

Figure 1:
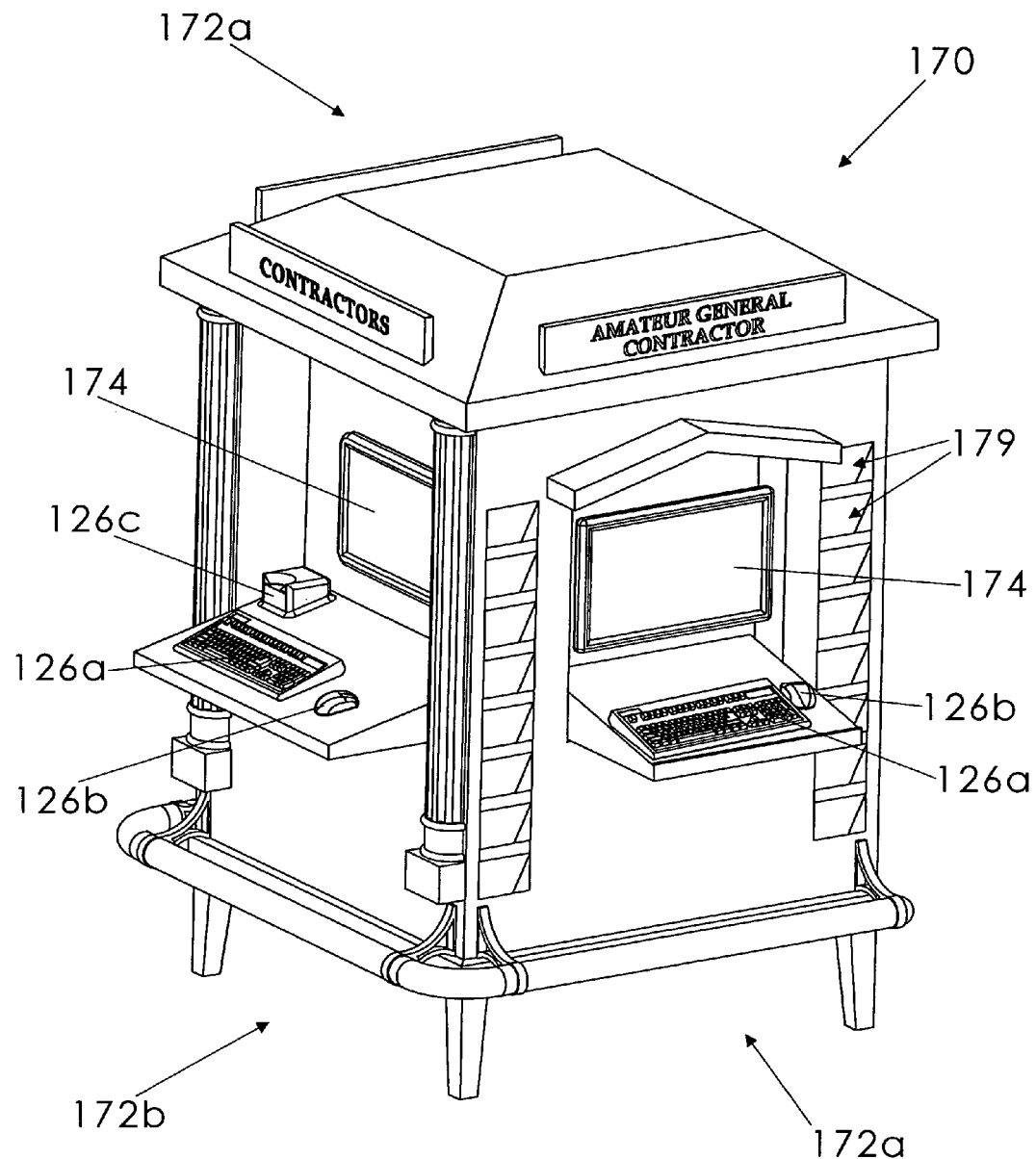
FIG. 1 is a perspective view of a kiosk of a system for managing construction projects according to a preferred embodiment of the present invention.
Figure 2:
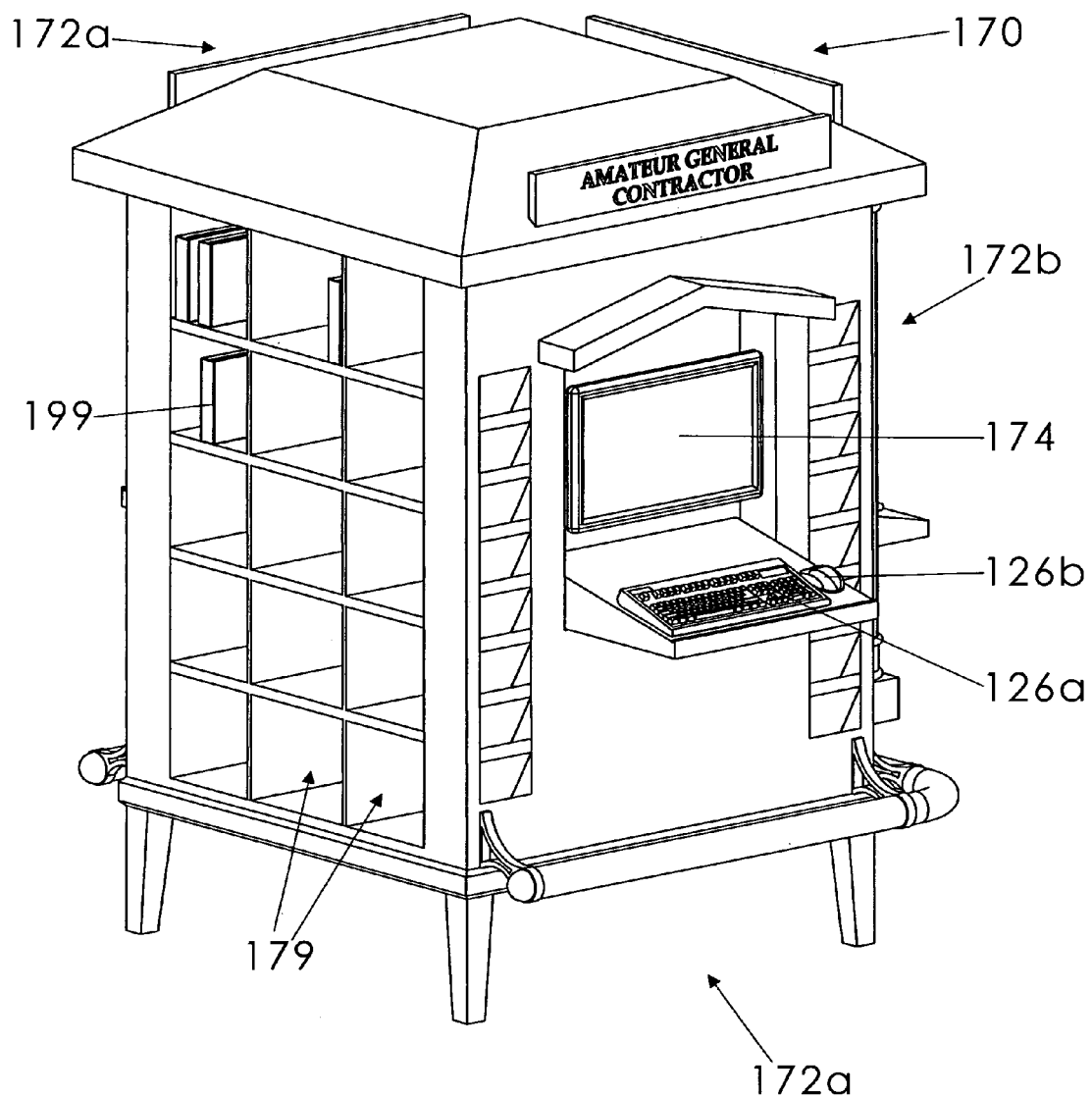
FIG. 2 is a perspective view from another angle of the kiosk as in FIG. 1.
Figure 11:
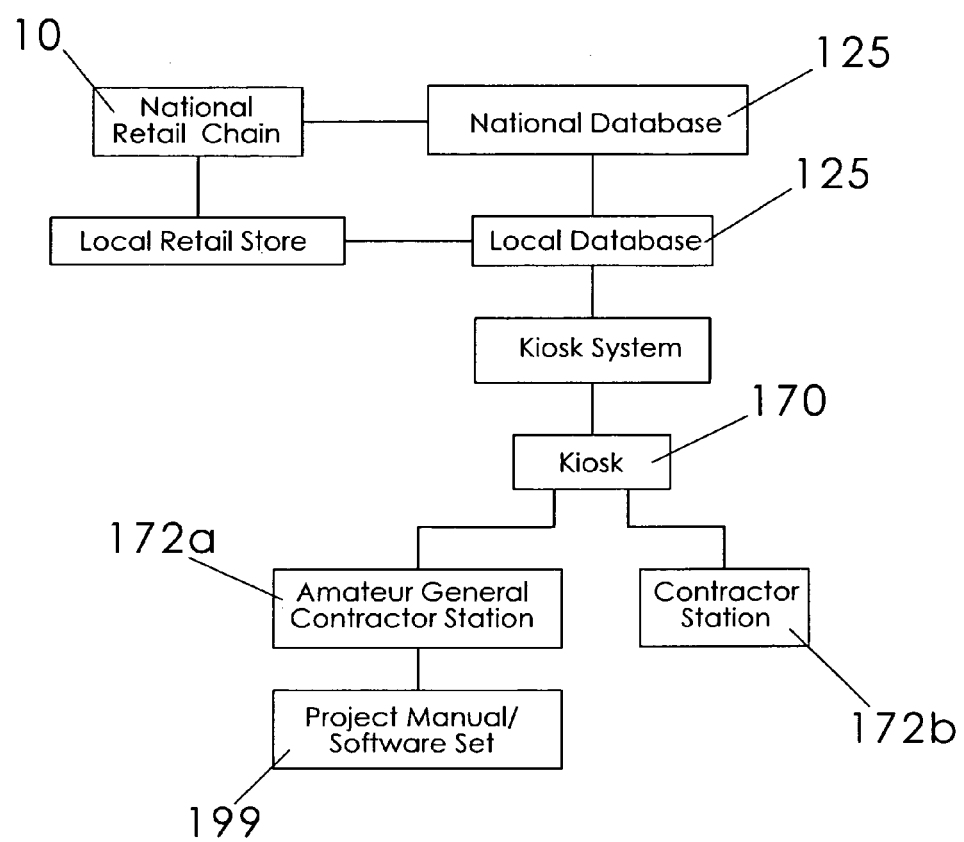
FIG. 11 is a block diagram of the system for managing construction projects according to a preferred embodiment of the present invention.

In one embodiment, as shown in FIG. 1 and FIG. 2, a kiosk 170 has two stations 172a allowing managers to interact with the database(s) 125 and a station 172b allowing contractors to interact with the database(s) 125. Each station 172a has a keyboard input device 126a and a mouse input device 126b, and station 172b has another keyboard input device 126a, another mouse input device 126b, and a card reader input device 126c. The kiosk 170 may include different or additional input devices 126 (e.g., touch-screen input devices, RFID reader input devices, etc.) and/or additional or fewer stations 172a, 172b, and users may be allowed to access the database(s) 125 at various remote locations, such as through the Internet. FIG. 11 shows an exemplary chain of kiosks 170 associated together in a national database 125 of a national retail chain 10. It should be noted that a Local Database is also denoted by reference numeral 125. The local database is essentially the same database as the national database, but may be filtered using according to the geographic location of the kiosk or a geographic-specific code of a user (e.g. a manager or contractor's zip code).

Figure 7:
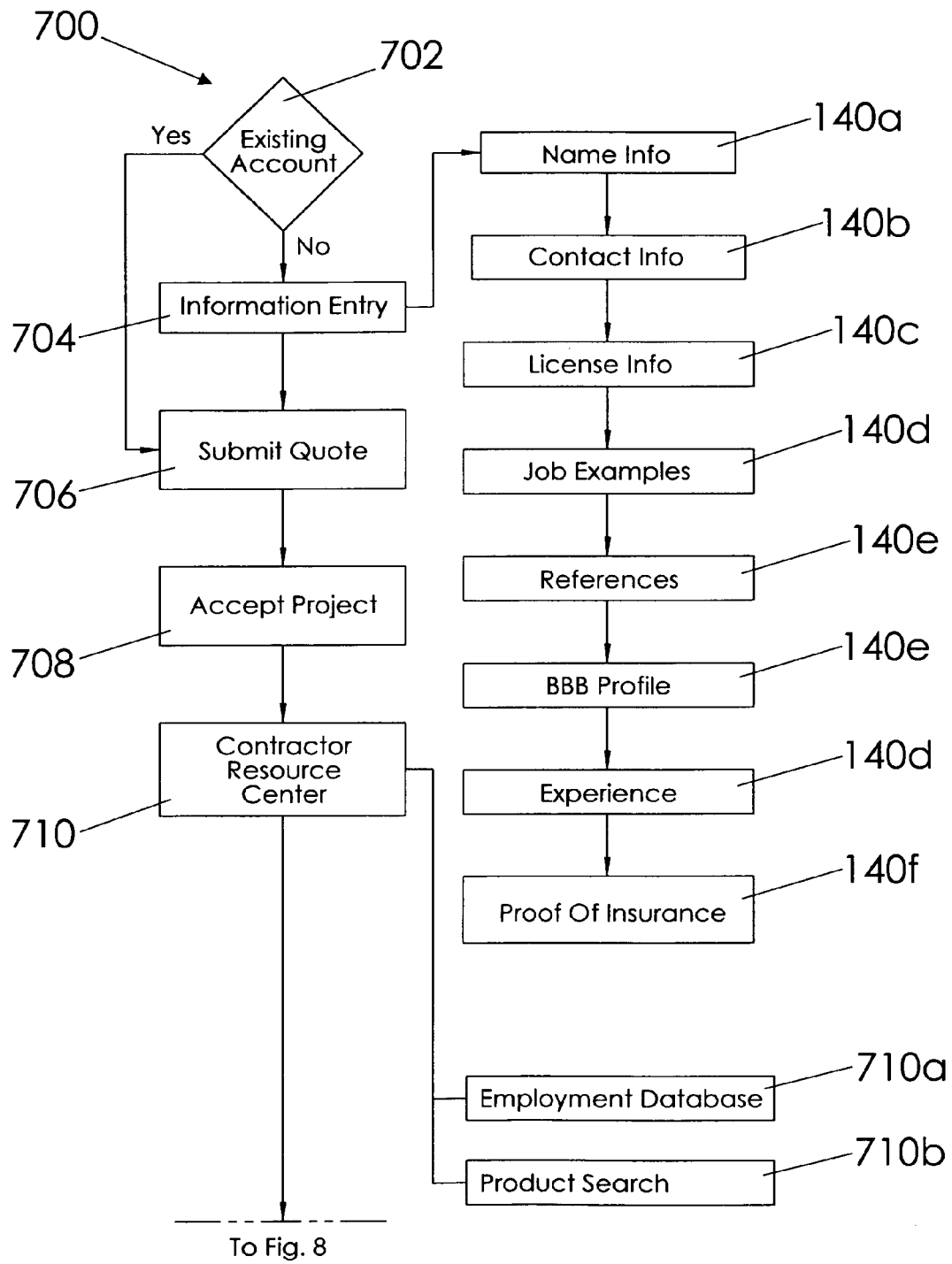
FIG. 7 is a flowchart illustrating a subcontractor initiating or using the system of FIG. 3.
Figure 8:
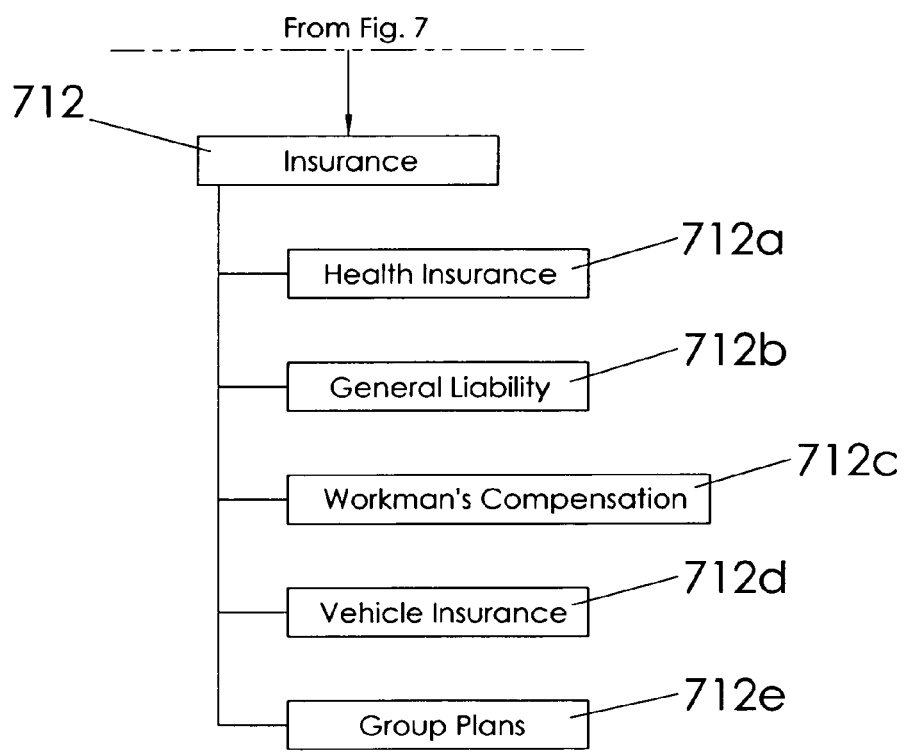
FIG. 8 is a flowchart illustrating a subcontractor accessing group benefit options offered by the system.

The contractor information 140 consists of information related to contractors (i.e., companies or workers having at least one construction skill) and may include, for example, name information 140a for a plurality of contractors, contact information 140b for the plurality of contractors, license information 140c for the plurality of contractors, experience information 140d for the plurality of contractors, reference information 140e for the plurality of contractors, and insurance information 140f for the plurality of contractors. FIG. 7 shows a process 700 performed by the system 100 according to an embodiment. At step 702, the processor 110 may determine and/or the contractor may indicate whether the contractor information 140 needs to be input to the database(s) 125. If so, at step 704 the contractor information 140 is entered (e.g., using the input devices 126 at the kiosk 170). For example, the contractor information 140 may be entered through the keyboard input device 126a at the station 172b and/or through the card reader input device 126c (e.g., a store credit card or another card with contractor information 140 may be scanned to obtain the information stored thereon).

Figure 4:
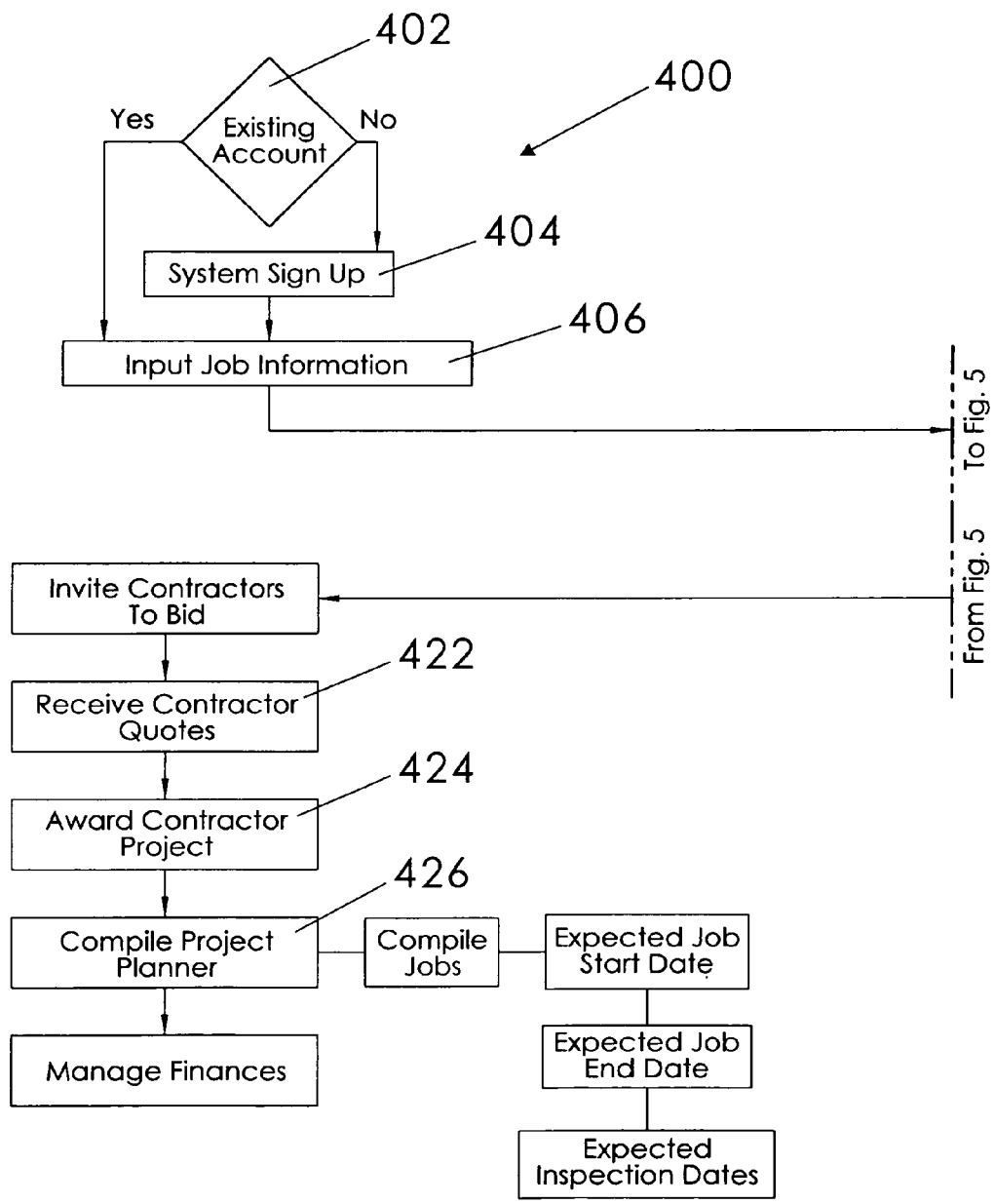
FIG. 4 is a flowchart illustrating a process of a project manager initiating and managing a project using the system of FIG. 3.
Figure 5:
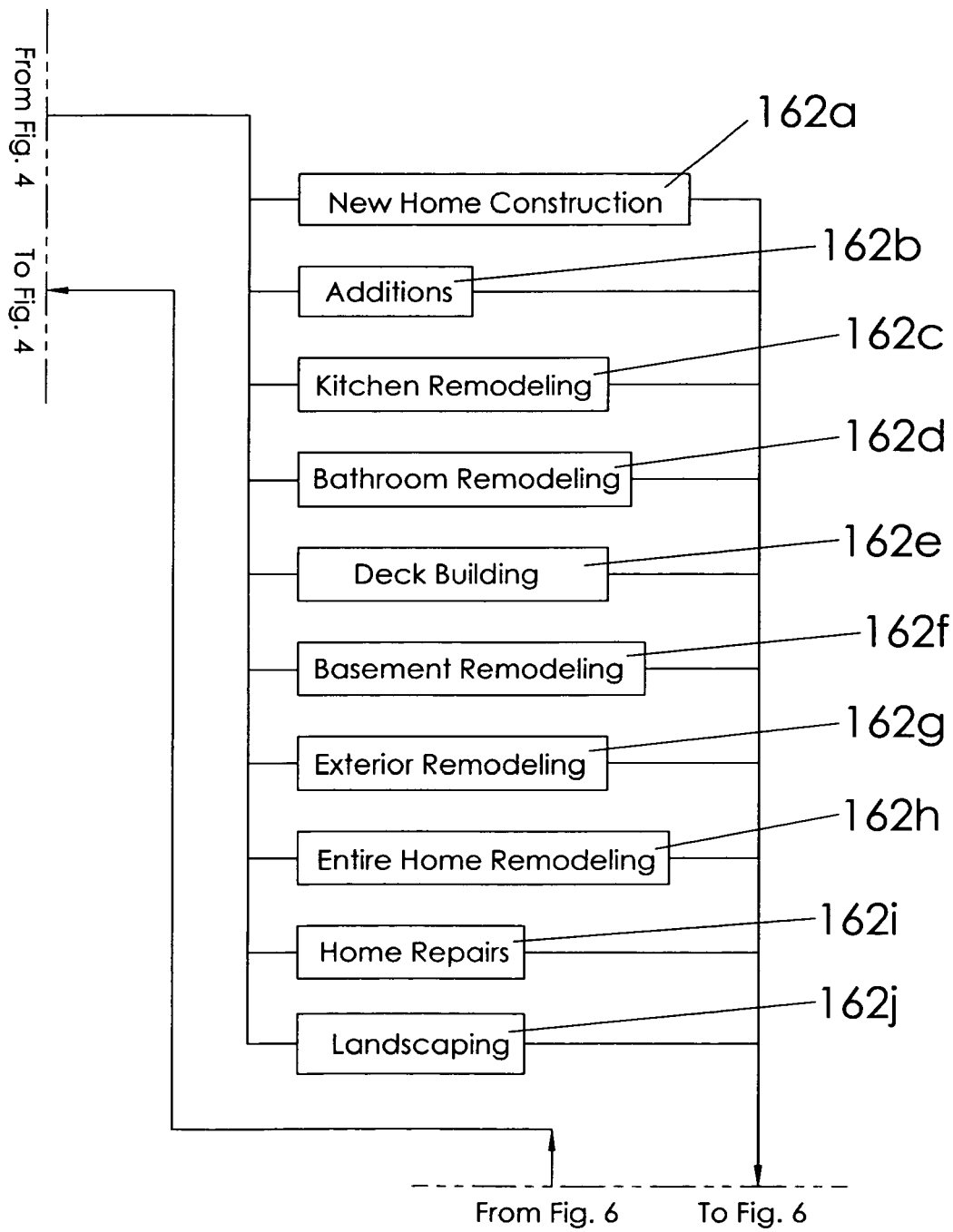
FIG. 5 is a flowchart illustrating a manager selecting a type of project to be managed.
Figure 6:
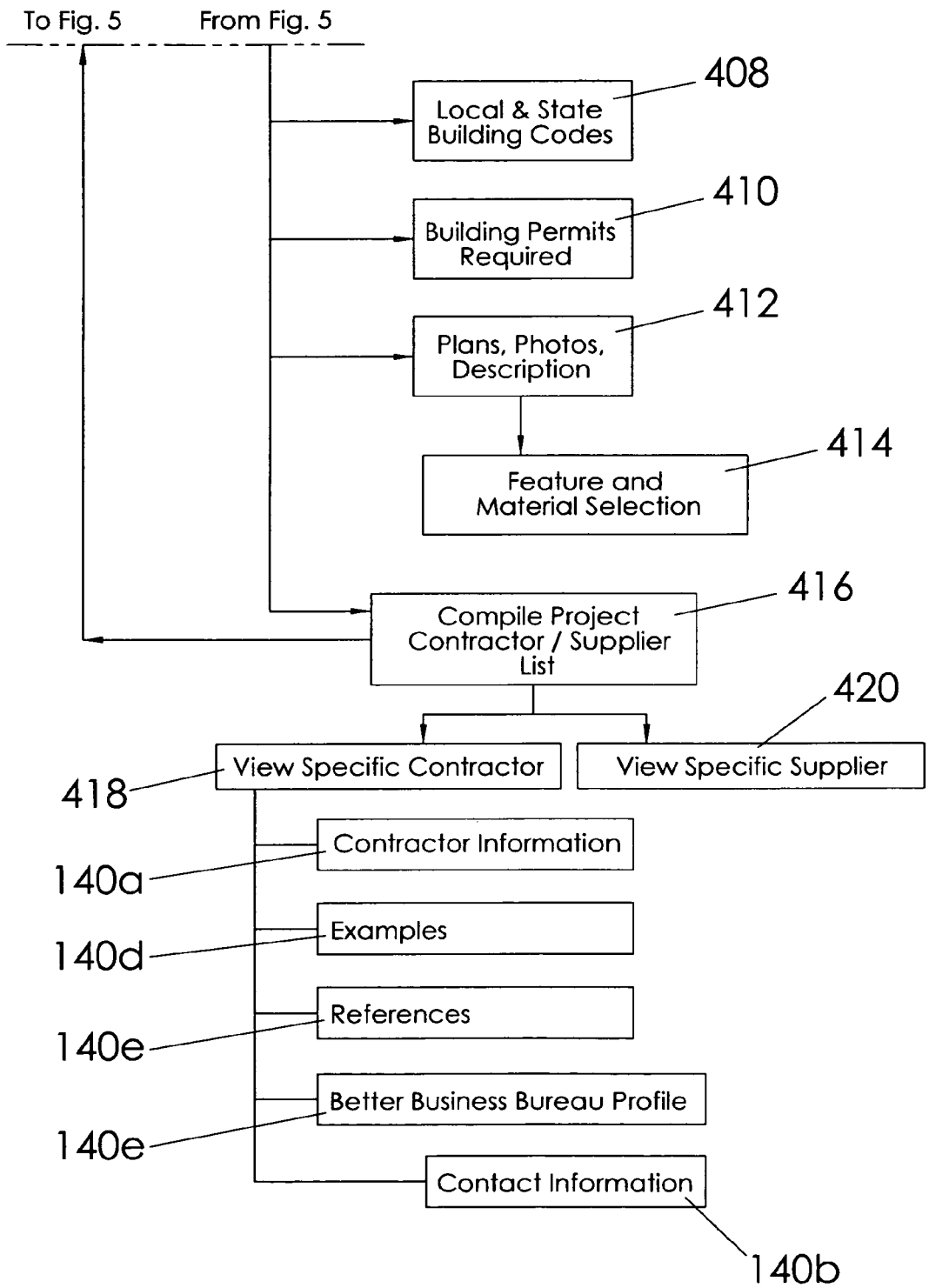
FIG. 6 is a flowchart illustrating the system supplying a manager with local information relevant to a managed project.

The manager information 150 consists of information related to managers (i.e., companies or individuals having one or more construction project to be completed) and may include, for example, contact information. FIG. 4 shows a process 400 performed by the system 100 according to an embodiment. At step 402, the processor 110 may determine and/or the manager may indicate whether the manager information 150 needs to be input to the database(s) 125. If so, at step 404 the manager information 150 is entered (e.g., using the input devices 126 at the kiosk 170). For example, the manager information 150 may be entered through the keyboard input device 126a at a respective station 172a.

The job information 160 consists of information related to the construction project to be completed and may include, for example, location of the project, and type of project (e.g., new home construction 162a, additions 162b, kitchen remodeling 162c, bathroom remodeling 162d, deck building 162e, basement remodeling 162f, exterior remodeling 162g, entire home remodeling 162h, home repairs 162i, landscaping 162j, etc.). In the process 400 shown in FIG. 4, the job information 160 is input at step 406 (e.g., using the input devices 126 at the kiosk 170).

After the construction information 130, the contractor information 140, the manager information 150, and the job information 160 are in the database(s) 125, programming in the processor(s) 110 may select particular construction information 130 that corresponds to the job information 160. For example, at step 408 of the process 400 (FIG. 6), the processor(s) 110 may select the building code information for the construction project to be completed in light of its specific location; at step 410, the processor(s) 110 may select the building permit information for the construction project to be completed in light of its specific location; at step 412, the processor(s) 110 may select the how-to information for the construction project to be completed in light of its specific location; and at step 414, the processor(s) 110 may select the material information 132a, 132b, 132c for the construction project to be completed in light of its location and details (e.g., a plan selected at step 412). The building code information (step 408), the building permit information (step 410), the how-to information (step 412), and the material information (step 414) may be output (e.g., through a display 174 in a respective station 172a in the kiosk 170, as shown in FIGS. 1 and 2).

After the construction information 130, the contractor information 140, the manager information 150, and the job information 160 are in the database(s) 125, programming in the processor(s) 110 may select particular contractor information 140 that corresponds to the job information 160. For example, at step 416 of the process 400 (FIG. 6), the processor(s) 110 may match contractors' contact information or license information to the location of the job and/or contractors' experience information or license information to the construction project to be completed to select contractors that may be appropriate for the construction project to be completed. The particular contractor information selected (i.e., that of the selected contractors) may then be associated with the respective job information 160 and may be output at step 418 (e.g., through the display 174 in a respective station 172a in the kiosk 170, as shown in FIGS. 1 and 2) for viewing by the respective manager. Suppliers that may be appropriate for the construction project to be completed may similarly be selected by the processor(s) 110 at step 416 (as shown) and may be output at step 420.

The process 400 may proceed from step 416 to step 422, where the manager may invite contractors selected at step 416 to bid on the construction project to be completed, from step 422 to step 424, where bids from the contractors may be received by the manager, and from step 424 to step 426, where the manager may award one of the contractors the job. Steps 422, 424, and 426 may be completed through the kiosk 170, over the telephone, through face to face meetings, or in other manners. After step 426, the process 400 may allow the manager to oversee budget, timeline, inspection, and other issues.

Returning to the process 700 (FIGS. 7 and 8), each contractor may submit quotes and accept projects at steps 706 and 708 in response to manager actions at steps 422 and 426 of process 400. The contractors may also utilize the database(s) 125 to search for employees 710a and products 710b (step 710) and communicate with at least one insurance company (step 712). Various insurance products may be available, including health insurance 712a, general liability insurance 712b, workman's compensation 712c, vehicle insurance 712d, and group plans 712e.

Figure 10:
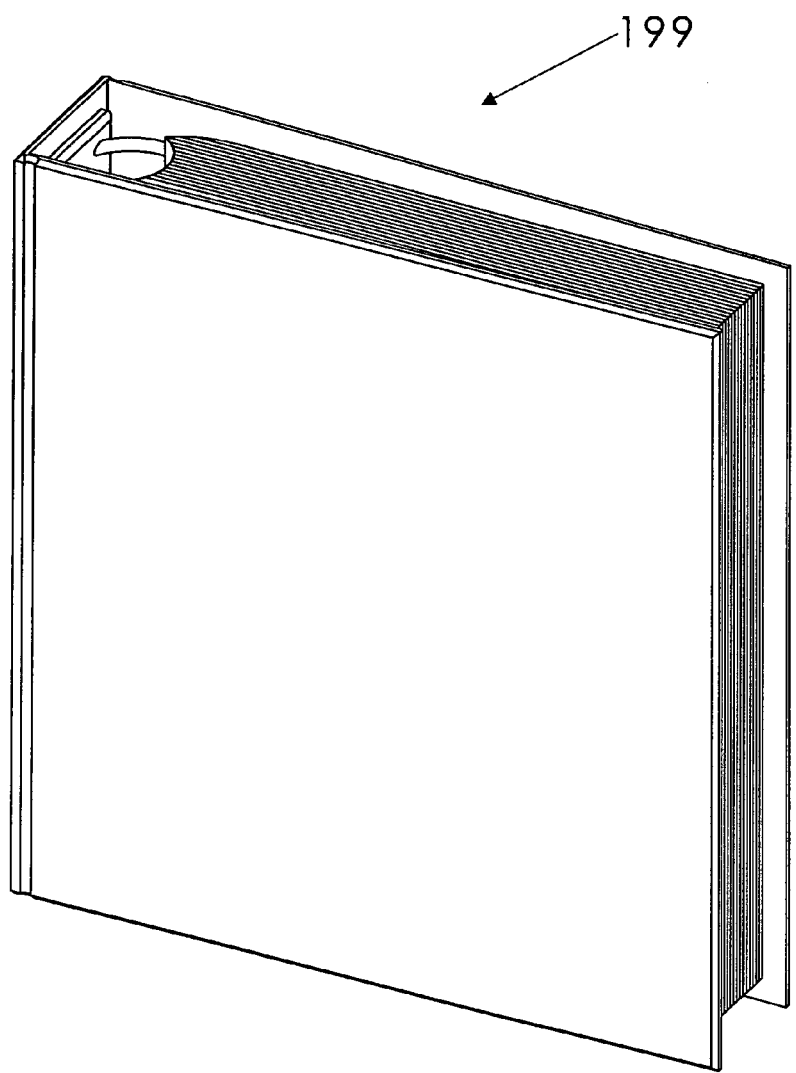
FIG. 10 is a perspective view of a manual or software set that may be sold in conjunction with access to the system of FIG. 3.

As shown in FIG. 10, a manual or software set 199 may be required to access the database(s) 125 (e.g., may contain an access code required to access the database(s) 125), and the manual or software set 199 may be purchased or may be free. The kiosk 170 (FIGS. 1 and 2) may include various bins 179 to store the manual or software set 199 and/or other publications relating to construction projects (e.g., manuals, product information, advertisements, etc.).

In use, a manager (e.g. a homeowner interested in managing his own construction project) may approach an appropriate station of a kiosk 170, such as may be positioned in a participating home improvement store, and enter project details therein as well as to receive instructions on how to proceed. The manager may discover qualified and interested subcontractor, request them to bid on respective aspects of the project, and award the project accordingly. The manager may choose from available material options and order materials. Conversely, subcontractors may register their availability and credentials at another station at the kiosk, bid on jobs at the request of a project manager (homeowner), and even obtain benefits made available by the system to contractors. The host location for the kiosk may receive benefit by offering construction materials for sale to the subcontractors and managers. Together, the system provides unique advantages to managers, contractors, and retail hosts.

It is understood that while certain forms of this invention have been illustrated and described, it is not limited thereto except insofar as such limitations are included in the following claims and allowable functional equivalents thereof.

The invention claimed is:

1. A system for managing a construction project, comprising:
    at least one computer processor;
    at least one electronic data storage device containing at least one database, said at least one database having construction information saved therein and being in data communication with the said least one processor;
    means for inputting contractor information into said at least one database;
    means for inputting manager information into said at least one database;
    means for inputting job information into said at least one database and associating respective job information with respective manager information;
    programming in data communication with said at least one processor to:
        select particular contractor information from said contractor information and associate said particular contractor information with respective job information;
        output said particular contractor information;
    select particular construction information from said construction information and associate said particular construction information with respective job information; and
    output said particular construction information;
    programming in data communication with said at least one processor to allow communication between at least one contractor corresponding to said particular contractor information and a manager corresponding to said manager information associated with said job information, and wherein:
        said construction information includes: how-to information for a plurality of jobs, building code information for a plurality of locations, building permit information for the plurality of locations, and material information for the plurality of jobs;
        said contractor information includes: name information for a plurality of contractors, contact information for the plurality of contractors, license information for the plurality of contractors, experience information for the plurality of contractors, reference information for the plurality of contractors, and insurance information for the plurality of contractors;
        said programming selects at least one job based on said job information;
        said programming selects a location based on said job information;
        said programming to select particular construction information is programming to:
            select said how-to information for said at least one selected job;
            select said building code information for said selected location;
            select said building permit information for said selected location; and
            select said material information for said at least one selected job; and
        said programming to select particular contractor information is programming to select at least one contractor by matching said job information to at least one of: said contact information, said license information, and said experience information; and
    at least one kiosk having at least first and second input devices in data communication with said at least one processor, and wherein:
        said means for inputting contractor information includes said first input device; and
        said means for inputting manager information includes said second input device.

2. The system of claim 1, further comprising means for updating said construction information saved in said at least one database.

3. The system of claim 1, wherein said kiosk has a plurality of bins to store publications relating to at least one job.

4. A system for managing a construction project, comprising:

a kiosk having at least one user input and at least one output device;

at least one computer processor;

at least one electronic data storage device containing at least one database, said at least one database having construction information saved therein and being in data communication with said at least one processor;

said construction information including: how-to information for a plurality of jobs, building code information for a plurality of locations, building permit information for the plurality of locations, and material information for the plurality of jobs;

programming in data communication with said at least one processor to:

place contractor information into said at least one database from said at least one user input; said contractor information including: name information for a plurality of contractors, contact information for the plurality of contractors, license information for the plurality of contractors, experience information for the plurality of contractors, reference information for the plurality of contractors, and insurance information for the plurality of contractors;

place manager information into said at least one database from said at least one user input;

place job information into said at least one database from said at least one user input;

associate respective job information with respective manager information;

select particular contractor information from said contractor information by matching said job information to at least one of: said contact information, said license information, and said experience information;

associate said particular contractor information with respective job information; and allow communication between at least one contractor corresponding to said particular contractor information and a manager corresponding to said manager information associated with said job information;

programming in data communication with said at least one processor to:

select particular construction information from said construction information and associate said particular construction information with respective job information; and output said particular construction information through said at least one kiosk output device; and programming in data communication with said at least one processor to:

select at least one job based on said job information;

select a location based on said job information;

select said how-to information for said at least one selected job;

select said building code information for said selected location;

select said building permit information for said selected location; and select said material information for said at least one selected job.

5. The system of claim 4, further comprising: means for updating said construction information saved in said at least one database; and programming in data communication with said at least one processor to allow communication between at least one contractor corresponding to said contractor information and at least one insurance company.

6. The system of claim 5, wherein said kiosk has a plurality of bins to store publications relating to at least one job.

7. The system of claim 6, wherein said kiosk has a first station for said contractors to interact with said at least one database and a second station for said managers to interact with said at least one database, said first station including at least one said user input, said second station including at least one other said user input.

8. The system of claim 4, further comprising programming in data communication with said at least one processor to allow communication between at least one contractor corresponding to said contractor information and at least one insurance company.

9. The system of claim 4, wherein said kiosk has a first station for said contractors to interact with said at least one database and a second station for said managers to interact with said at least one database, said first station including at least one said user input, said second station including at least one other said user input.

* * * * *